C. H. VEEDER.
COUNTING MACHINE.
APPLICATION FILED APR. 15, 1920.
1,385,409.
Patented July 26, 1921
2 SHEETS—SHEET 1.
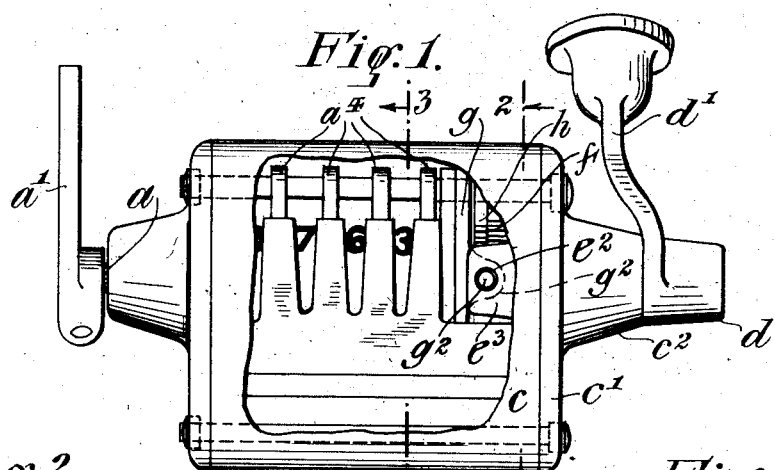
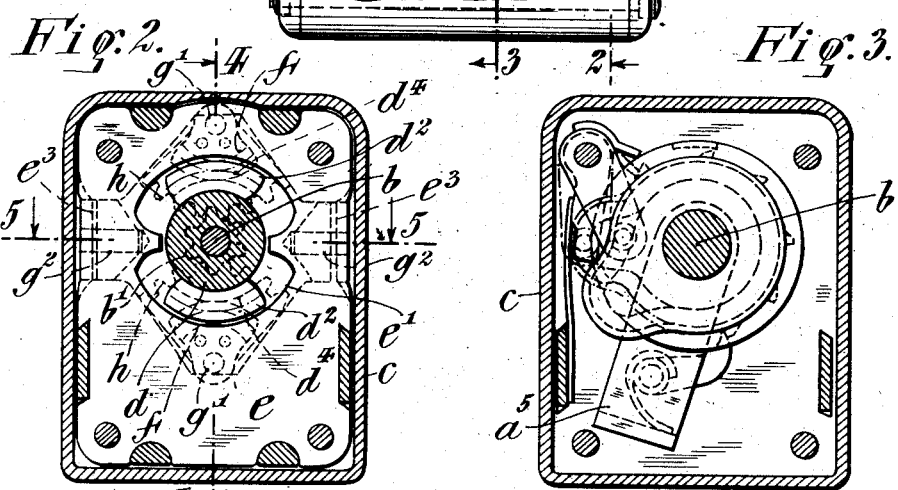
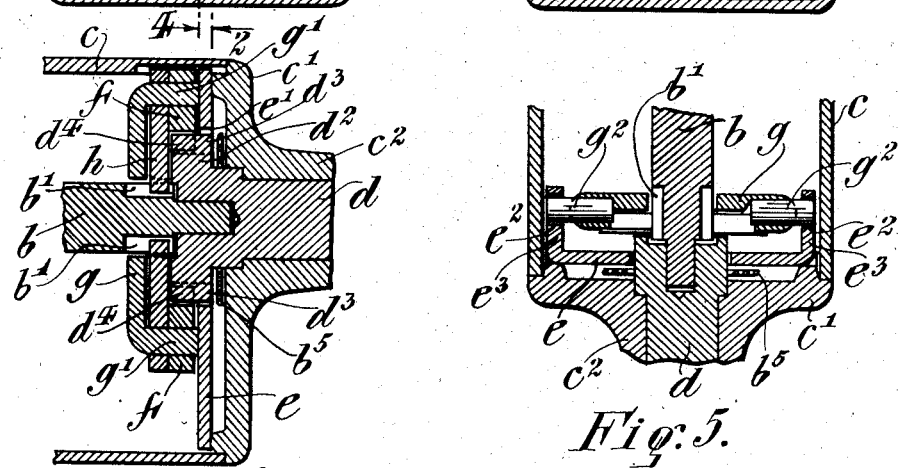

C. H. VEEDER.
COUNTING MACHINE.
APPLICATION FILED APR. 15, 1920.
1,385,409.
Patented July 26, 1921.
2 SHEETS—SHEET 2.
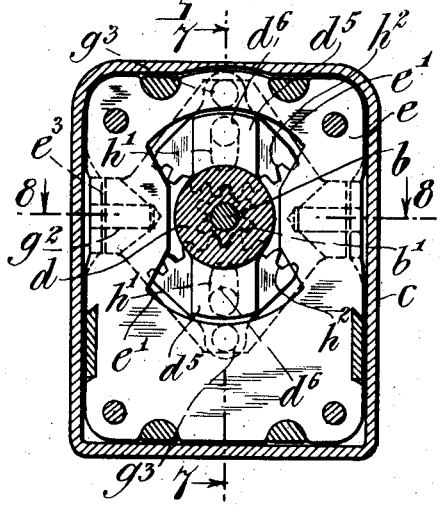
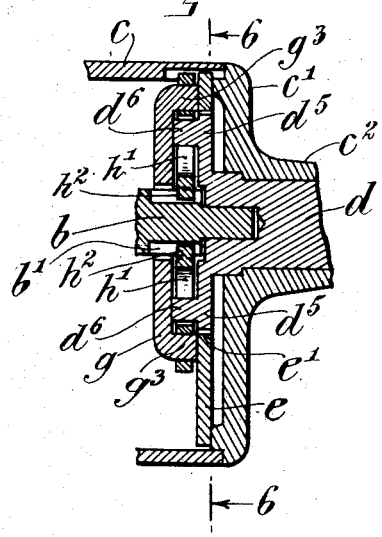
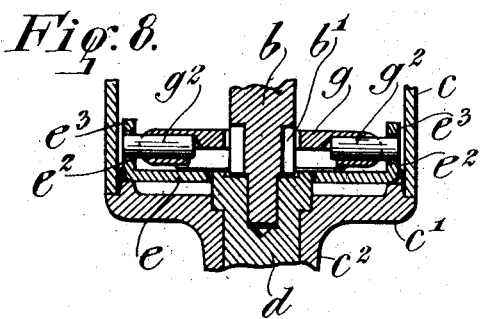

UNITED STATES PATENT OFFICE.

CURTIS HUSSEY VEEDER, OF HARTFORD, CONNECTICUT, ASSIGNOR TO THE VEEDER MANUFACTURING COMPANY, OF HARTFORD, CONNECTICUT, A CORPORATION OF CONNECTICUT.

COUNTING-MACHINE.

1,385,409. Specification of Letters Patent. Patented July 26, 1921.

Application filed April 15, 1920. Serial No. 374,085.

*To all whom it may concern:*

Be it known that I, CURTIS HUSSEY VEEDER, a citizen of the United States, residing in the city of Hartford, State of Connecticut, have invented certain new and useful Improvements in Counting-Machines, of which the following is a specification, reference being had to the accompanying drawings, forming a part hereof.

In another application for Letters Patent of the United States, Serial #360,248, filed February 20, 1920, there is shown and described a counting machine in which the transmission of motion from the actuating shaft to the resetting shaft, by which the number wheels which have been moved in counting operations are reset to zero, is effected through a form of planetary gearing, in which the rotation of the transmitting gears on their axes is accomplished through the partial revolution of such gears about an external axis. Such form of planetary gearing permits the incorporation of the devices for actuating the resetting shaft with the counting and resetting devices in compact form, secures such pefect balancing of the parts that very little resistance to operation is offered and the necessity of extreme accuracy in the machining of parts is avoided and permits a construction which is comparatively simple and inexpensive. By the present invention the same general results are obtained, but with a slightly different form of transmitting devices, which are not strictly of the planetary type. The invention will be more fully explained hereinafter with reference to the accompanying drawings in which it is illustrated and in which—

Figure 1 is a view in elevation of a counting machine in which the invention is embodied, the casing being partly broken away to show the parts within.

Fig. 2 is a view in transverse section on the plane indicated by the broken line 2—2 of Fig. 1 looking in the direction of the arrows.

Fig. 3 is a view in transverse section on the plane indicated by the broken line 3—3 of Figs. 1 and 4, looking in the direction of the arrows.

Fig. 4 is a partial view in longtiudinal section on the plane indicated by the broken line 4—4 of Fig. 2, looking in the direction of the arrows.

Fig. 5 is a partial view in longitudinal section on the plane indicated by the broken line 5—5 of Fig. 2, looking in the direction of the arrows.

Figs. 6, 7 and 8 are views similar respectively to Figs. 2, 4 and 5, but showing a modification, Fig. 6 being a view in transverse section on the plane indicated by the broken line 6—6 of Fig. 7, Fig. 7 being a partial view in longitudinal section on the plane indicated by the broken line 7—7 of Fig. 6, and Fig. 8 being a partial view in longitudinal section on the plane indicated by the broken line 8—8 on Fig. 6.

The numbering mechanism may be of any usual or suitable construction, the present invention not being directly concerned therewith. So far as the same is represented in the drawings it may comprise a numbering shaft shown at $a$ in Fig. 1, with an arm $a'$ for connection to the part, the movements of which are to be counted, a series of number wheels $a^4$ mounted upon a common axis, a pawl frame $a^5$ connected to the shaft $a$ and by which the number wheels are driven forward, and a resetting shaft $b$, which seats at one end in the end of the shaft $a$, constitutes the common support for the number wheels $a^5$, and is provided with means, known in the art, by which, through the oscillation of the resetting shaft, those number wheels which have been moved in successive counting operations are reset to zero when the counting operation has been completed. All of the parts thus far referred to, including the devices actuated by the resetting shaft for setting the number wheels to zero, may be of any usual or suitable construction, the present invention being concerned with the means for actuating the resetting shaft $b$. Referring first to the construction shown in Figs. 1–5, it will be seen that the end wall $c'$ of the casing $c$ is provided with a hub $c^2$ to form a bearing for the actuating shaft $d$ which has secured to it a suitable fingerpiece $d'$ for operation by the finger. The shaft $d$, within the casing, is provided with a socket to receive the reduced end of the resetting shaft $b$ and is flanged as at $d^2$, on opposite sides of the axis. A smooth or untoothed portion, $d^3$, of each flange is received within a suitable aperture $e'$ in a plate $e$ and in another plane the flange is toothed, as at $d^4$, to engage a gear segment $f$. Each gear segment $f$ is pivoted on a pin $g'$ carried by a plate $g$, and has secured thereto, as by rivets, as indicated in Fig. 3, a gear segment $h$ which meshes with the gear teeth $b'$ formed on the resetting shaft $b$. The plate $g$ is supported so as to be capable of limited sidewise movement, for the purpose of compensating for any irregularities or inaccuracies in the gear segments and coöperating parts, by pins $g^2$ which are received loosely in holes $e^2$ formed in ears $e^3$ of the plate $e$. A suitable spring $b^5$ is applied to the operating shaft $d$ for the purpose of returning the shaft to initial position after operation by the finger.

In the operation of the construction shown in Figs. 1–5, as will be understood, the oscillation of the shaft $d$, under the pressure of the operator's finger, effects an oscillation of the gear segments $f$ and $h$ and a consequent oscillation of the resetting shaft $b$. The extent of angular movement of the shaft $b$ is about 324° and is therefore sufficient to return to the zero position every number wheel which has been driven forward, whether it has been driven forward through one number space or more up to nine. Through the gear ratios of the coacting gear segments and gear teeth on the shaft $b$, an oscillation of the actuating shaft $d$ through about 62° is sufficient to effect the full oscillation of the resetting shaft at about 324° so that the resetting can be effected with a slight movement of the finger and therefore with great rapidity.

In the construction shown in Figs. 6, 7 and 8 the transmitting mechanism between the operating shaft and the resetting shaft functions substantially like that already described, but the construction is slightly different. The flanges $d^5$ on opposite sides of the axis of the actuating shaft $d$ are guided as before in an aperture $e'$ of the plate $e$, but instead of being formed with teeth to engage a gear segment, each flange is formed with a lug $d^6$ which engages a radial slot $h'$ of the gear segment $h^2$ which, as before, engages the teeth $b'$ of the resetting shaft $b$. The gear segments $h^2$ are pivoted as before on pins $g^3$ of a plate $g$, which is carried by pins $g^2$, which enter apertures $e^2$ in ears $e^3$ of the plate $e$, so that limited sidewise movement of the plate $g$ and therefore of the gear segments $h^2$ is permitted. The mode of operation of the construction shown in Figs. 6, 7 and 8 will be understood without further explanation.

It will be understood that various changes in details of construction and arrangement can be made to suit different conditions of use and that the invention, therefore, is not limited to the precise construction shown and described herein except as pointed out in the claims.

I claim as my invention:

1. In a resetting mechanism for a numbering machine, the combination of a toothed resetting shaft, an actuating shaft in line with the resetting shaft, a pivotally mounted gear segment in mesh with the resetting shaft, means to support the gear segment and means whereby through oscillation of the actuating shaft the gear segment is oscillated on its pivot.

2. In a resetting mechanism for a numbering machine, the combination of a toothed resetting shaft, an actuating shaft in line with the resetting shaft, a plate mounted within the casing of the machine, a gear segment pivotally supported on said plate and in mesh with the toothed reseting shaft and means whereby through oscillation of the actuating shaft the gear segment is oscillated on its support.

3. In a resetting mechanism for a numbering machine, the combination of a resetting shaft, an actuating shaft in line with the resetting shaft and a pivoted gear segment in operative relation with the resetting shaft and the actuating shaft.

4. In a resetting mechanism for a numbering machine, the combination of a toothed resetting shaft, an actuating shaft having a toothed flange, a supporting plate, a gear segment pivotally mounted on the supporting plate and in engagement with the toothed flange of the actuating shaft and a second gear segment secured to the first and in engagement with the toothed resetting shaft.

5. In a resetting mechanism for a numbering machine, the combination of a resetting shaft, an actuating shaft, a pair of gear segments in operative relation with the actuating shaft and with the resetting shaft and oscillated by the oscillation of the actuating shaft, and supporting means on which said gear segments are pivotally mounted, said supporting means having freedom for limited sidewise movement.

6. In a resetting mechanism for a numbering machine, the combination of a toothed resetting shaft, an actuating shaft having toothed flanges, a pair of gear segments in operative engagement with the toothed flanges of the actuating shaft, a second pair of gear segments secured to the first and in operative engagement with the resetting shaft, and a support upon which said gear segments are pivotally mounted, said support having freedom for limited sidewise movement.

This specification signed this 5th day of April, A. D. 1920.

CURTIS HUSSEY VEEDER.